(12) United States Patent
Zhu et al.

(10) Patent No.: US 10,182,448 B2
(45) Date of Patent: Jan. 15, 2019

(54) INTER-NETWORK INTERFERENCE COORDINATION METHOD

(71) Applicant: SHANGHAI RESEARCH CENTER FOR WIRELESS COMMUNICATIONS, Shanghai (CN)

(72) Inventors: Yuanping Zhu, Shanghai (CN); Jiang Wang, Shanghai (CN); Qiaoling Yu, Shanghai (CN); Yong Teng, Beijing (CN); Kari Horneman, Oulu (FI)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 0 days.

(21) Appl. No.: 15/329,523

(22) PCT Filed: Dec. 22, 2015

(86) PCT No.: PCT/CN2015/098350
§ 371 (c)(1),
(2) Date: Jan. 26, 2017

(87) PCT Pub. No.: WO2016/101882
PCT Pub. Date: Jun. 30, 2016

(65) Prior Publication Data
US 2017/0290023 A1    Oct. 5, 2017

(30) Foreign Application Priority Data
Dec. 26, 2014  (CN) .......................... 2014 1 0848850

(51) Int. Cl.
*H04W 72/08* (2009.01)
*H04W 16/14* (2009.01)
(Continued)

(52) U.S. Cl.
CPC ......... *H04W 72/082* (2013.01); *H04L 5/0032* (2013.01); *H04W 16/14* (2013.01); *H04W 16/10* (2013.01)

(58) Field of Classification Search
CPC ............. H04W 72/04; H04W 72/0406; H04W 72/0426; H04W 72/08; H04W 72/082; H04W 16/14; H04L 5/0032; H04L 5/0035
See application file for complete search history.

(56) References Cited

U.S. PATENT DOCUMENTS

| 9,369,915 B2 | 6/2016 | Hooli |
| 9,521,681 B2 | 12/2016 | Hulkkonen |

(Continued)

FOREIGN PATENT DOCUMENTS

| CN | 101594617 | 12/2009 |
| CN | 102036252 | 4/2011 |

(Continued)

OTHER PUBLICATIONS

X. Li;S.A. Zekavat, Spectrum sharing across multiple service providers via cognitive radio nodes, journal, Mar. 22, 2010, p. 551-561, vol. 4, Issue: 5, IET Communications United Kingdom.

(Continued)

*Primary Examiner* — Kevin D Mew
(74) *Attorney, Agent, or Firm* — WPAT, PC

(57) ABSTRACT

Disclosed is a network interference coordination method in a co-primary spectrum sharing scenario. The method comprises the following steps: a first network and a second network negotiate an inter-network shared band, the shared band being in a shared spectrum pool; the first network evaluates inter-network interference; the first network determines whether to perform internal coordination, if internal coordination is performed, the first network performs internal coordination; if internal coordination is not performed, (Continued)

request the second network to perform inter-network interference coordination; the second network determines whether to perform internal coordination, if internal coordination is performed, the second network performs internal coordination; and if internal coordination is not performed, go back to the step of negotiating, by a first network and a second network, an inter-network shared band. The present invention can fairly and properly implement inter-network interference coordination in the co-primary spectrum sharing scenario.

20 Claims, 9 Drawing Sheets

(51) Int. Cl.
    *H04L 5/00* (2006.01)
    *H04W 16/10* (2009.01)

(56) References Cited

U.S. PATENT DOCUMENTS

| | | | | |
|---|---|---|---|---|
| 2002/0061031 A1* | 5/2002 | Sugar | ............ | H04W 16/14 370/466 |
| 2003/0083095 A1* | 5/2003 | Liang | ............ | H04W 72/1215 455/552.1 |
| 2004/0147243 A1* | 7/2004 | McKenna | ............ | H04B 7/18506 455/403 |
| 2008/0232345 A1* | 9/2008 | Espina | ............ | H04W 16/14 370/350 |
| 2009/0017829 A1* | 1/2009 | Laroia | ............ | H04W 16/12 455/446 |
| 2009/0170452 A1* | 7/2009 | Rubin | ............ | H03D 7/1441 455/118 |
| 2009/0180492 A1* | 7/2009 | Hu | ............ | H04W 16/14 370/462 |
| 2012/0275318 A1* | 11/2012 | Blasco Claret | ............ | H04W 52/40 370/252 |
| 2013/0272219 A1* | 10/2013 | Singh | ............ | H04W 16/14 370/329 |
| 2013/0295948 A1* | 11/2013 | Ye | ............ | H04W 72/0453 455/452.1 |
| 2013/0301544 A1* | 11/2013 | Drucker | ............ | H04W 72/0453 370/329 |
| 2015/0078353 A1* | 3/2015 | Zhang | ............ | H04W 28/0236 370/336 |
| 2016/0174109 A1* | 6/2016 | Yerramalli | ............ | H04W 28/26 370/329 |
| 2017/0013468 A1 | 1/2017 | Zhu et al. | | |
| 2017/0099605 A1* | 4/2017 | Li | ............ | H04W 16/14 |
| 2017/0280463 A1* | 9/2017 | Learned | ............ | H04W 52/267 |
| 2017/0359731 A1* | 12/2017 | Soldati | ............ | H04W 16/14 |
| 2018/0116001 A1* | 4/2018 | Zhang | ............ | H04W 16/14 |

FOREIGN PATENT DOCUMENTS

| | | |
|---|---|---|
| CN | 103262592 | 8/2013 |
| CN | 103763708 | 4/2014 |
| WO | 2012062364 | 5/2012 |
| WO | 2013045741 | 4/2013 |

OTHER PUBLICATIONS

ETSI 3rd Generation Partnership Project (3GPP), LTE;Evolved Universal Terrestrial Radio Access (E-UTRA) and Evolved Universal Terrestrial Radio Access Network (E-UTRAN);Overall description;Stage 2, Technical Specification, Jun. 2013, All pages, Release 11, European Telecommunications Standards Institute 2013 France.

* cited by examiner

INTER-NETWORK INTERFERENCE COORDINATION METHOD

BACKGROUND

Technical Field

The invention relates to an inter-network interference coordination method, and in particular to an interference coordination method used between networks with the same priority, which belongs to the technical field of wireless communications.

Related Art

Co-primary Spectrum Sharing is a novel spectrum access mode, which can realize dynamic, flexible co-primary spectrum sharing between different operators. It requires two or more wireless frequency band license holders to reach consensus by negotiating on how to use respective partial authorized frequency bands together. The whole spectrum sharing mode is controlled by the national frequency band management agency. Therefore people are assuming a novel mode: the frequency band management agency does not allocate a section of spectrum resource to a certain operator in an exclusive way anymore but to a number of potential operators (users) at the same time. These potential operators (users) need to fairly use this part of spectrum resource together according to certain specific rules. Aimed at such a novel spectrum usage mode, there have been organizations and agencies in the world that started discussion. For example, in May, 2004, the German federal network management agency referred to it in the discussion on the allocation of 3.5 GHz band in the fixed broadband wireless access system (Fixed BWA). Besides, the U.S. federal communications commission also puts forward a similar concept in the light licensing solution about 3650 MHz to 3700 MHz. The co-primary spectrum sharing policy is regarded as the next step of the spectrum sharing concept of authorized sharing access (ASA). The difference between the two is that the co-primary spectrum sharing will realize dynamic, flexible co-primary spectrum sharing between different operators, while the priorities of frequency occupation of spectrum sharing objects of ASA are different.

In recent years, heterogeneous networking has attracted wide attention. Such a flexible networking mode can meet a variety of different requirements. For example, the deployment of macro cells can provide wide-area coverage, while the deployment of a large number of small cells, such as micro cells, pico cells and femto cells, can not only enhance indoor coverage, but can also provide high-speed access. Compared with macro base stations, the transmission power of the base stations of these small cells is much lower, and moreover, in some indoor deployment scenarios, wireless signals will have great through-wall loss when penetrating a building. Therefore, under certain geographic position isolation conditions, the possibility of realization of spectrum sharing between different operators in the hybrid networking mode is high.

In a co-primary spectrum sharing scenario, an operator will suffer from inter-cell interference (intra-network interference for short hereinafter) in the network of the same operator as well as to inter-operator interference (IOI) (also called inter-network interference) coming from networks of a different operator. Generally, intra-network interference can be estimated according to the existing neighboring cell measurement mechanism and operator network deployment strategy (such as a network topology and transmission power of each cell), and an inter-cell interference coordination mechanism in an operator is then utilized to effectively inhibit inter-cell interference in the same operator.

3GPP LTE has defined some signaling capable of being communicated between cells in standards related to interference coordination in an operator for interference coordination between the cells. For example, relative narrowband Tx power (RNTP) has been defined for downlinks to indicate transmission powers of base stations on different resource blocks, and uplinks have overloaded indication (OI) and high interference indication (HII) for uplink inter-cell interference coordination reference (for details, see 3GPP TS36.300, v11.6.0 "Overall description", June 2013). However, in a spectrum sharing scenario between different operators, on one hand, because of business competition and network security, detailed information about network deployment is hard to be shared between the different operators; and on the other hand, the existing neighboring cell measurement mechanism in the same operator includes too much sensitive information, and the sharing of these sensitive information may not be supported by the operators. These two limitations bring a challenge to interference coordination between different operators. Therefore, an inter-network interference evaluation and coordination method needs to be designed.

In recent years, there have been a lot of researches on flexible spectrum sharing technology, which can be mainly divided into two aspects: one is to realize spectrum sharing between different cells in the same network; others are related to spectrum sharing between networks/systems of different systems, such as cognitive radio technology (for details, see X. Li and S. Zekavat, "Spectrum sharing across multiple service providers via cognitive radio nodes," IET Communications, vol. 4, no. 5, pp. 551-561, March 2010). But in the conventional spectrum sharing mode between networks/systems of different systems, there is a difference between a primary system and a secondary system. For the primary system, a shared frequency band is an authorized frequency band, the primary system has a higher priority, and the priority of the secondary system in using frequency is low. In the past, there was a lot of work of measuring interference between different systems in this scenario, such as methods disclosed in K. J. Hooli, and et al., "PCT/FI2011/050840: Inter-system interference in communications", September 2011 and J. Y. Hulkkonen, and et al., "PCT/EP2010/067264: Interference management for coexisting radio systems", November 2010.

On Jan. 23, 2014, the applicant submitted a Chinese patent application named a network spectrum sharing method (application number: CN201410032758.3), disclosing a co-primary spectrum sharing solution for realizing shared spectrum allocation between operators.

However, previous works related to interference evaluation and coordination in co-primary spectrum sharing scenarios have not been seen yet.

SUMMARY

To tackle the defects of the prior art, the invention provides a network interference coordination method in a co-primary spectrum sharing scenario.

In order to achieve the purpose, the invention adopts the following technical solution:

A method for network interference coordination, using which, a first network (A) and a second network (B) can share a shared spectrum pool with the same priority, includes the following steps:

the first network and the second network negotiate about an inter-network shared frequency band, and the shared frequency band is in the shared spectrum pool;

the first network evaluates inter-network interference;

the first network judges whether to execute internal coordination, if internal coordination can be executed, then the first network executes internal coordination, and then turn to the step of "the first network evaluates inter-network interference"; if internal coordination cannot be executed, then the second network is requested to conduct inter-network interference coordination, and the next step is executed;

the second network judges whether to execute internal coordination, if internal coordination can be executed, then the second network executes internal coordination, and then turn to the step of "the first network evaluates inter-network interference"; if internal coordination cannot be executed, then turn to the step of "the first network and the second network negotiate about an inter-network shared frequency band".

The invention also provides a network interference coordination method, in which networks include a first network (A) and a second network (B) sharing a specific frequency band at the same priority, and the network interference coordination method includes the following steps:

the first network and the second network negotiate about an inter-network shared frequency band;

the first network evaluates the inter-network interference and transfer the evaluation results to the second network;

the second network judges whether to execute internal coordination, if internal coordination can be executed, then the second network executes internal coordination, and then turn to the step of "the first network evaluates and communicates inter-network interference"; if internal coordination cannot be executed, then the first network is requested to conduct inter-network interference coordination, and then turn to the next step;

the first network judges whether to execute internal coordination, if internal coordination can be executed, then the first network executes internal coordination, and then turn to the step of "the first network evaluates and communicates inter-network interference"; and if internal coordination cannot be executed, then turn to the step of "the first network and the second network negotiate about an inter-network shared frequency band".

Compared with the prior art, the invention effectively solves interference coordination between networks with the same priority; when strong inter-network interference exceeds a threshold, intra-network coordination is first conducted, and inter-network coordination is then conducted; while the networks with the same priority can fairly and reasonably use a shared frequency band, the efficiency of interference coordination is increased, and network performance is effectively improved.

DETAILED DESCRIPTION

The technical content of the invention is further described in detail below in combination with the drawings and the specific embodiments.

A network spectrum sharing method provided by the invention can be applied to 2G/3G/4G or any of other future wireless communication networks, and although multi-operator co-primary spectrum sharing is not applied in the existing networks as yet, such as 2G/3G, the possibility that the method can be applied to 2G/3G cannot be ruled out. A spectrum sharing solution between different operators or different networks is described hereinafter only by taking the 4G-LTE network as an example. The network case that the different operators have the same priority is mainly discussed bellow, and the case that the same operator has the same priority in different networks is similar, and therefore is not described anymore herein.

The network spectrum sharing method is mainly applicable to two networks with the same priority, i.e. a first network A and a second network B, which can also be called a first operator A and a second operator B.

In a scenario of conducting co-primary spectrum sharing between different operators/networks, the communication between a base station and terminals will suffer from inter-cell interference (intra-network interference) coming from the same network and interference (inter-network interference) coming from different networks. In the invention, "inter-network interference", which is also called "interference between networks" or "interference between operators", includes interference between different networks operated by the same operator, as well as interference between networks respectively operated by different operators.

When a spectrum resource is shared between the different networks, the invention can provide a method for interference evaluation and communication between the networks and a method for reasonable and effective interference coordination in spectrum sharing on the basis of an interference evaluation result.

<First Embodiment>

Figure 1:
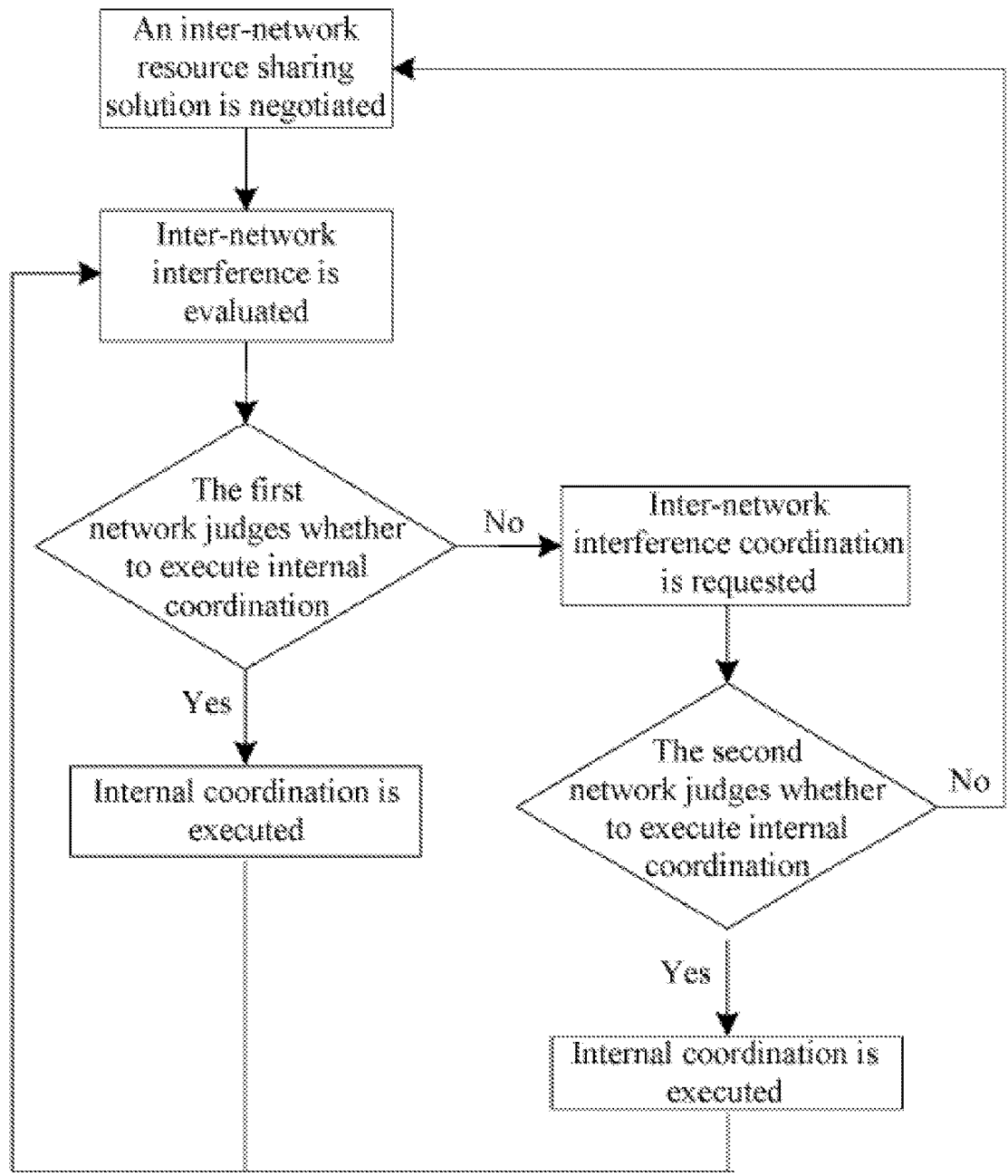
FIG. 1 is an overall flow block diagram of a first embodiment of the invention.

As shown in FIG. 1, the overall solution of the first embodiment includes the following steps:

negotiating an inter-network resource sharing solution;

evaluating inter-network interference;

the first network judging step that the first network judges whether to execute internal coordination, if it is judged that internal coordination can be executed, then the first network executes internal coordination, and then turn to the step of "evaluating inter-network interference"; if it is judged that internal coordination cannot be executed, then inter-network interference coordination is requested, and the next step is executed; and the second network judging step that the second network judges whether to execute internal coordination, if internal coordination can be executed, then the second network executes internal coordination, and then turn to the step of "evaluating inter-network interference"; if internal coordination cannot be executed, then turn to the step of "an inter-network resource sharing solution is negotiated".

In order to simplify description, a solution of interference evaluation and communication between operators is given in the embodiment, taking a co-primary spectrum sharing scenario between the two operators as an example. The invention assumes that interference occurs between a first network A operated by a first operator and a second network B operated by a second operator which are co-primary spectrum resource sharing networks. The first network A is an interference-affected network, wherein a base station $eNB_{A1}$ is an interference-affected base station, and $eNB_{A2}$ is a base station neighboring the $eNB_{A1}$ in the same network. The second network B is a network causing interference on the first network A, wherein a base station $eNB_B$ is a base station transmitting interference. The first network also comprises an $O\&M_A$ (Operations and Maintenance entity), and the second network also comprises an $O\&M_B$. It should be noted that the first network and the second network can also be operated by the same operator, the case that the two networks are operated by the different operators is only discussed in the invention, but those skilled in the art can understand that the case that the two networks are operated by the same operator is also applicable to the invention.

The method for event-triggered network interference coordination of the first embodiment of the invention is described in detail below on the basis of FIG. 2 to FIG. 6.

Figure 2:
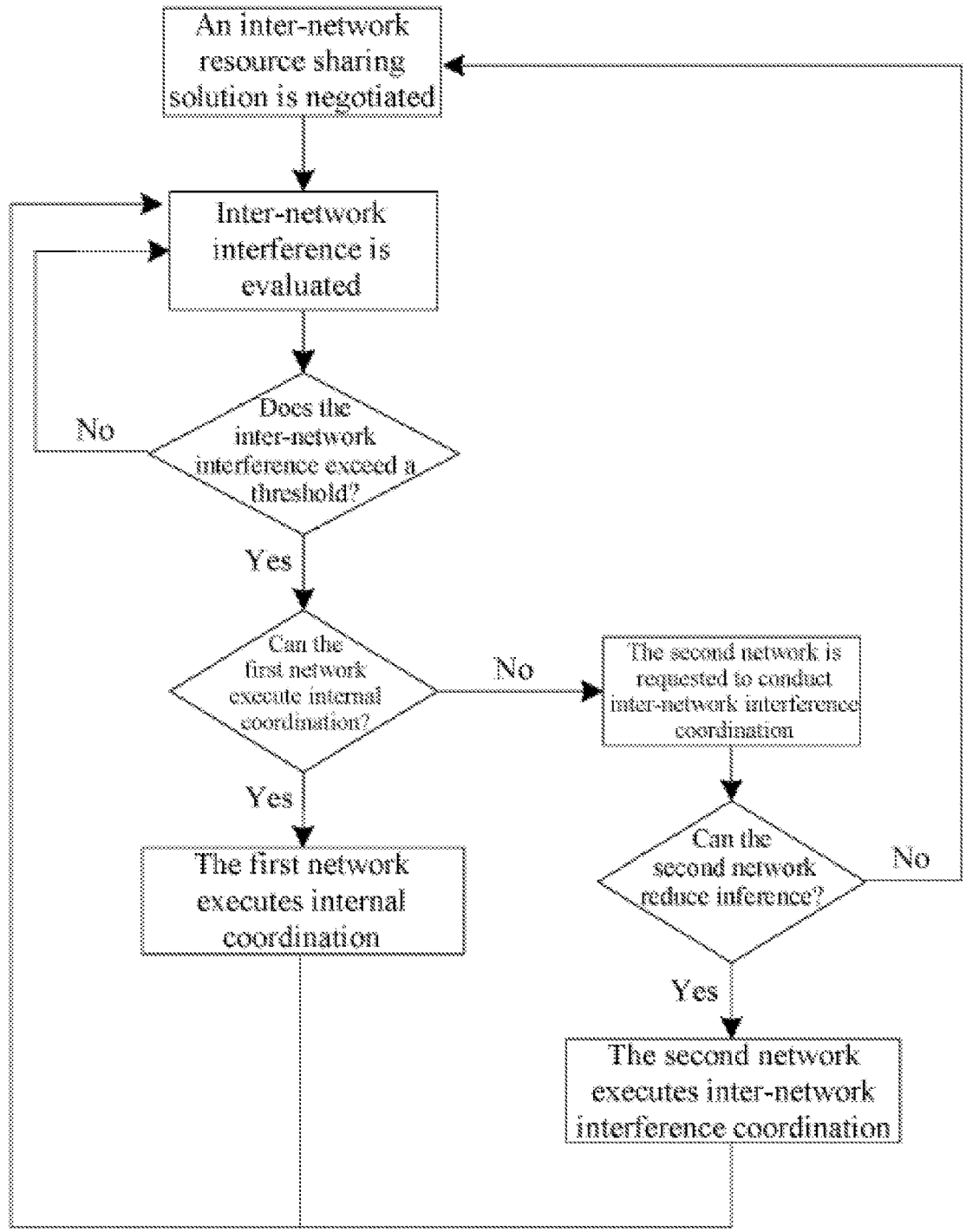
FIG. 2 is a specific flow block diagram of the first embodiment in FIG. 1.

FIG. 2 is the specific flow diagram of the network interference coordination method under an event triggering mode, and FIG. 3 to FIG. 6 describe each step in FIG. 2 in detail. As shown in FIG. 2, the network interference coordination method under the event triggering mode includes the following steps:

Step 1: An inter-network resource sharing solution is negotiated. A spectrum sharing solution for sharing a spectrum resource between different operators is first negotiated between the two operators (for example, the first operator A and the second operator B). The spectrum sharing solution assigns spectra in a spectrum resource pool shared by the two operators into three categories, the first category is a spectrum resource (exclusive resource A) which is exclusive to the operator A (the first network A), the second category is a spectrum resource (exclusive resource B) which is exclusive to the operator B (the second network B), and the third category is a spectrum resource (shared resource or shared frequency band) which is fairly used by the operator A and the operator B together. The spectrum sharing solution also includes a shared resource allocation principle negotiated between the operators, and you can refer to the Chinese patent application named a network spectrum sharing method (application number: CN201410032758.3) which is submitted by the applicant on Jan. 23, 2014.

Step 2: The first network evaluates inter-network interference. According to the resource sharing solution determined in Step 1, the management node $O\&M_A$ of the operator A allocates a certain shared frequency band in the shared spectrum to the base station $NB_{A1}$, and allocates an exclusive frequency band to another base station $NB_{A2}$. The base station $NB_{A1}$ using the shared resource periodically initiates inter-network interference evaluation to require a $UE_A$ to conduct measurement and reporting. The $UE_A$ reports a measurement result (signal+interference intensity or only interference intensity may be reported depending on specific circumstances), and the base station obtains cell-specific inter-network interference according to the measurement result reported from the $UE_A$.

Of course, the process of evaluating inter-network interference can be event-triggered or conducted periodically. For example, triggering events can be link interruption caused by strong interference on the communication between the base station and a UE and so on. Inter-network interference evaluation can also be conducted by the base station using the shared resource, so the base station fulfills the Inter-network interference evaluation by itself without requiring the UE to conduct measurement.

The base station $NB_A$ reports cell-specific inter-network interference to the network management node $O\&M_A$ of the operator A. The network management node gathers network-specific inter-network interference.

Step 3: The first network judges whether the inter-network interference on the first network exceeds a threshold.

The first network A judges whether the network-specific inter-network interference exceeds the preset threshold according to the network-specific inter-network interference gathered by the network management node. If the network-specific inter-network interference does not reach the threshold, the judgment result is negative and then turn to the step of "evaluating inter-network interference" to conduct inter-network interference evaluation again. If the judgment result is YES, then the next step is executed.

Step 4: The first network judges whether to execute internal coordination.

According to the magnitude of the network-specific inter-network interference and available resources in the first network A, the network management node $O\&M_A$ of the first network A judges whether interference can be reduced or strong interference can be avoided merely by executing internal coordination. In another word, the network management node $O\&M_A$ judges whether inter-network interference coordination needs to be initiated.

Under the condition that the network-specific inter-network interference reaches the threshold, if the network management node $O\&M_A$ judges that there still is an exclusive frequency band providable by the first network A, or that the first network A is capable of meeting the requirement by other means, then the judgment result of the first network A is that strong interference can be avoided only by executing internal coordination without needing to initiate inter-network interference coordination. At the moment, the first network A can allocate the resources within the network for solution, and Step 5 is executed; and if it is judged that only executing internal coordination cannot meet the requirement, then inter-network interference coordination is initiated: a negotiation request is sent to the second network B, moreover, network-specific inter-network interference indication is sent to the second network B, and Step 6 is executed.

Step 5: The first network executes internal coordination. In the previous step, the management node $O\&M_A$ of the first network judges that the network-specific inter-network interference has reached the threshold, and that the first network has enough exclusive frequency bands or other means for meeting the network requirement. So, in this step, the first network allocates the exclusive frequency bands to strong interference-affected cells, or adopts the other means for solution, such as handovering users of the corresponding interference-affected cells to the neighboring cells, or trying to allocate other carriers in the shared frequency band.

"Interference-affected cells" mean cells in the first network, which suffer from inter-network interference exceeding the threshold. The threshold is preset by the first network A, and can be determined by negotiation between the first network A and the second network B or can be set by the first network A alone without negotiation with the second network. Because the first network A and the second network B are networks with the same priority, the preferred method is that the first network A and the second network B negotiate to determine the threshold, and moreover, the two networks set the same threshold in order to ensure fair usage of the shared resource. Strong interference means that the inter-network interference value exceeds the threshold.

Step 6: The first network communicates the network-specific inter-network interference to the second network. The first network has judged in Step 4 that only executing internal coordination cannot meet the requirement, thus, the network management node O&M$_A$ of the first network sends the obtained network-specific inter-network interference indication to the second network, to request the second network to carry out adjustment.

Step 7: The second network judges whether the interference can be reduced. After the second network B receives the network-specific inter-network interference indication sent by the first network A, cells (cells causing interference) which cause the strong interference on the first network A are found out, and the frequency resource (exclusive frequency band) exclusively occupied by the second network B is tried to be allocated to these cells, or the other means (such as decreasing transmission power) is adopted. If the second network B does not have enough exclusive frequency band or the other means cannot be adopted, then the first network A and the second network B can negotiate about an inter-network resource sharing adjustment solution, and turn to Step 1 again.

Specifically, after the second network B receives the network-specific inter-network interference indication coming from the first network A, the management center O&M$_B$ of the operator B judges whether the second network can reduce interference. If the second network B has an exclusive frequency band for allocation, then the exclusive frequency band is allocated to the base station NB$_B$ (causing the strong interference on the interference-affected cells of the operator A) in the second network B; and if the second network B does not have an exclusive frequency band for allocation, then the other means, such as reducing the emitting power of the base station NB$_B$ causing the interference on the first network, is adopted.

If the management center O&M$_B$ of the second network B judges that the second network B cannot reduce the interference, for example, the second network B does not have enough frequency band resources or the emitting power of the interference-causing base station cannot be decreased anymore, then Step 1, and an inter-network spectrum reallocation request is initiated in order to renegotiate an inter-network resource sharing adjustment solution.

Step 8: The second network conducts inter-network interference coordination. According to the judgment in Step 7, the management center O&M$_B$ of the second network B determines to adopt the mode of allocating the exclusive frequency band, or the mode of reducing the power or other means to reduce the interference on the first network.

The first embodiment of the invention is described in detail below in combination with FIG. 3 to FIG. 6. Here, one registered user of the operator A (the first network A) is defined as UE$_A$, a serving base station of the operator A is eNB$_{A1}$, O&M$_A$ represents an O&M (Operations and Maintenance Entity) entity of the operator A (first network A), and O&M$_B$ represents an O&M entity of the operator B (the second network B). In communication with the serving base station, the UE$_A$ will suffer from inter-cell interference coming from the base station (such as eNB$_{A2}$) of the same operator network (the first network A) and inter-network interference coming from the base station eNB$_B$ of the different operator B (the second network B).

Step 1: An inter-network resource sharing solution is negotiated.

The specific step is as follows: the first network and the second network work out a shared spectrum between the first network A and the second network B by measuring network signals. After the operator A and the operator B negotiate with each other to determine spectrum resources which can be respectively occupied by the two networks, and then allocate the spectrum resources respectively in their networks. In the invention, one specified frequency band (a shared frequency band of the first network A and the second network B) shared by the first network A and the second network B is allocated to the eNB$_{A1}$ and the eNB$_B$, and the first network A has an exclusive frequency band and the second network B has an exclusive frequency band.

The shared frequency band and the exclusive frequency bands jointly constitute a shared spectrum pool. Since the frequency resource is shared between the operators, interferences on uplinks and downlinks will be generated between the networks of the operators. In the embodiment, taking inter-network interference received by the downlinks as an example, the process of evaluating and communicating the inter-network interference is described.

Step 2: The first network evaluates the inter-network interference.

Figure 3:
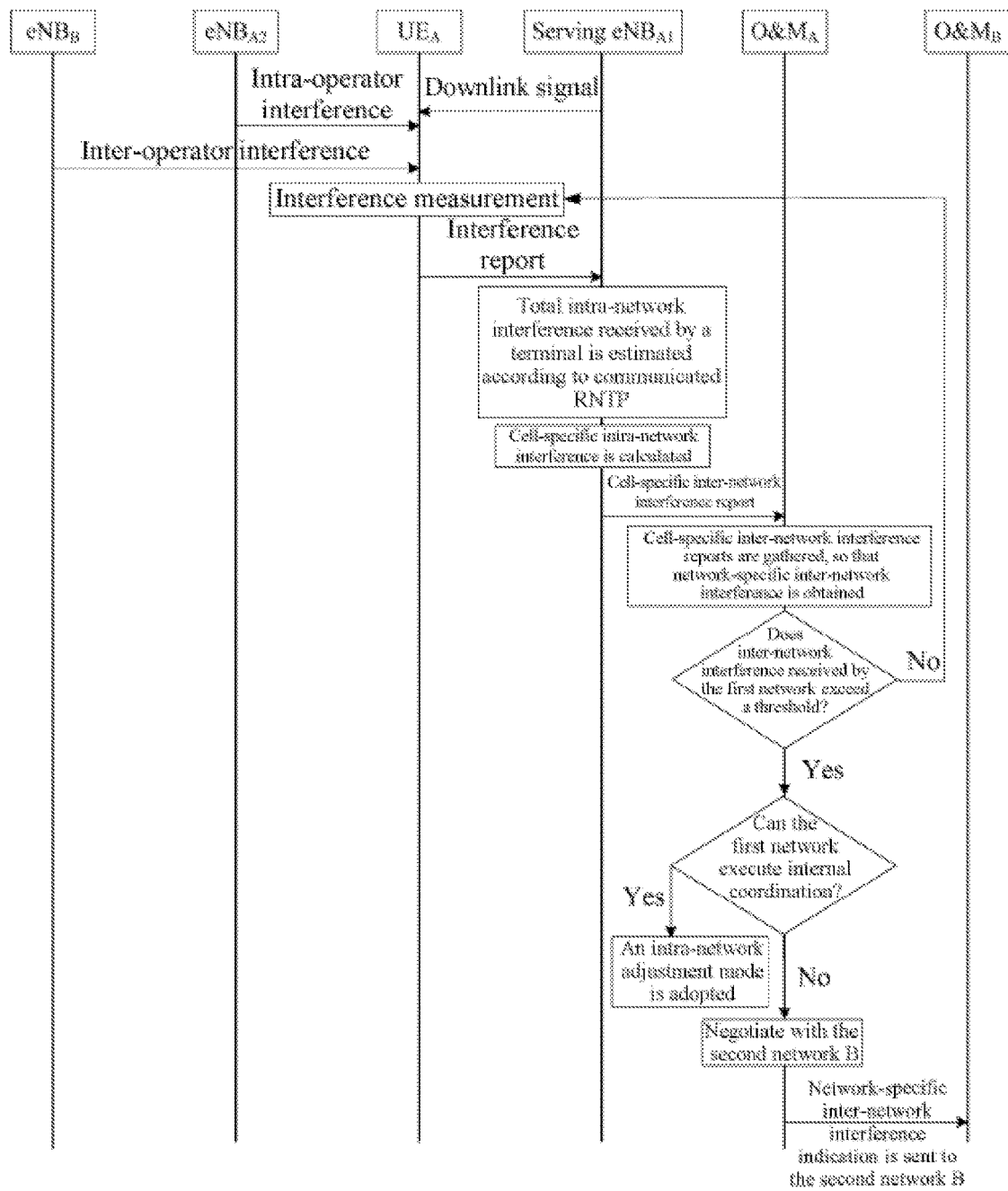
FIG. 3 is a schematic time sequence diagram before inter-network coordination initiation of the first embodiment in FIG. 1.

As shown in FIG. 3, Step 2 specifically includes the following steps:

Step 2A: Estimation of inter-network interference received by the terminal.

As shown in FIG. 3, the terminal UE$_A$ of the first network A receives a downlink signal from the base station eNB$_{A1}$, and starts inter-network interference estimation. The UE$_A$ suffers from the interference coming from the base station eNB$_{A2}$ of the first network A, and the eNB$_{A2}$ is an intra-network neighboring base station of the eNB$_{A1}$, so the interference of the base station eNB$_{A2}$ received by the UE$_A$ is intra-network interference (intra-operator interference).

Moreover, the UE$_A$ also suffers from the interference coming from the base station eNB$_B$ of the second network B, and the eNB$_B$ is a neighboring base station which is not in the same network as the eNB$_{A1}$, so the interference of the base station eNB$_B$ received by the UE$_A$ is inter-network interference (inter-operator interference).

After conducting interference measurement, the UE$_A$ reports total downlink interference received by the UE$_A$ to the serving base station eNB$_{A1}$. Interference measurement can be conducted only by the base station/UE using the shared frequency band, the advantage of which is that measurement and reporting overheads are reduced. In consideration of dynamics of a scheduling policy and prevention of rule-violating spectrum usage by counter-party (such as the counter-party's unreasonable usage of the exclusively occupied spectrum of one party), it is suggested that every cell in the networks (the first network and the second network) using the shared spectrum pool conducts interference measurement.

The eNB$_{A1}$ estimates total interference (intra-operator interference or intra-network interference) in the same operator according to network deployment topology information and neighbor cell measurement and information interaction in the same operator supported by the existing protocols. Therefore, for a certain cell using the given frequency resource, the inter-network interference received by the cell can be obtained by subtracting the intra-network interference received by the cell from the total interference thereof.

The $eNB_{A1}$ estimates, in the total interference received by the terminal $UE_A$, the total power of the inter-cell interference (intra-network interference) in the operator by executing the following steps:

1. Estimation of intra-network interference link transmission loss. The reference signal (RS) transmission power of the base station is communicated between the neighboring cells in the network of the same operator, and according to a reference signal received power (RSRP) result of each neighboring cell in the neighbor cells measurement report from the terminal, the base station then calculates inter-cell interference link transmission loss:

> interference link transmission loss=reference signal transmission power−terminal-measured RSRP of the corresponding cell.

2. Estimation of interference power of each interference link in the operator. According to RNTP communicated by the neighboring base station in the same operator, the base station learns about the transmission power of each interference cell on the resource block scheduled by the $UE_A$, and then calculates the interference power of each interference link in combination with the transmission loss of each interference link calculated in the previous step:

> interference power=interference source transmission power−interference link transmission loss.

3. Estimation of inter-cell interference sum in the operator. The base station sums up the interference powers of all the interference links in the same operator estimated in the previous step, so that total inter-cell interference power in the operator received by the $UE_A$ is obtained.

Step 2B: Estimation of cell-specific inter-network interference

The base station $eNB_{A1}$ subtracts total inter-cell interference power (intra-network interference) in the network from the total interference received by the terminal $UE_A$, so that inter-network interference power received by the $UE_A$ is obtained:

> cell-specific inter-network interference=total interference received by the terminal in the network− intra-network interference received by the terminal Step 2C: Generation and submission of a cell-specific inter-network interference report In the invention, a cell-specific inter-network interference report, which records an average of inter-network interferences received on all component carriers (CC) used by each cell within a period of time, is defined.

Affected by the scheduling policy, in one cell, the same frequency band of the spectrum resource may be allocated to different terminals by the base station in different scheduling periods. Therefore, within a given statistic period, the base station calculates a time average of the inter-network interference power on each physical resource block (PRB), according to the cell-specific inter-network interference reports of all the terminals. The base station then sums up the time averages of the inter-network interference powers received by individual resource blocks in the carriers allocated by the base station, obtaining a cell-specific inter-network interference average in the statistical period, so that a cell-specific inter-network interference report is generated and reported to the management node O&M of the operator.

The cell-specific inter-network interference report includes averages of inter-network interferences received by specific carriers and corresponding carrier numbers.

The corresponding management node can also be other entities, and in the embodiment, the O&M entity of the operator is chosen. The interference measurement on the uplinks is conducted by the base station itself, and after completing the interference measurement on the downlinks, the terminals report to the corresponding serving base station.

It can be understood that another alternative solution is that the base station calculates the inter-network interference power (inter-network interference) on each resource block according to the reports of all the terminals. The base station then sums up the inter-network interference powers received by each resource block in the carriers allocated by the base station, and then calculates a time average of cell-specific inter-network interference power in the statistical period, so that a cell-specific inter-network interference report is generated.

The format of the cell-specific inter-network interference report includes signaling name, carrier indication and signaling description. Signaling name means the name of a signaling, and is the cell-specific inter-network interference report (the cell-specific inter-network interference report of the downlinks and the cell-specific inter-network interference report of the uplinks need to be differentiated). Carrier indication is the carrier number. Signaling description is the inter-network interference average received by a cell on a specific carrier.

| Signaling Name | Carrier Indication | Signaling Description |
| --- | --- | --- |
| cell-specific inter-network interference report (downlink/uplink) | carrier number | an inter-network interference average received by a cell on a specific carrier |

Step 2D: Calculation of a network-specific inter-network interference value

The management node $O\&M_A$ entity of the operator of the first network A receives the cell-specific inter-network interference reports coming from a plurality of cells of the first network, and acquires the inter-network interference received by each cell on the respective allocated carrier, by reading carrier numbers in the signaling and the inter-network interference average received by each cell on respective allocated carrier. Finally, the management node $O\&M_A$ entity gathers the cell-specific inter-network interference report submitted by each cell deployed in the first network to use the shared frequency band, to generate network-specific inter-network interference.

Similarly, the cells submitting the cell-specific inter-network interference reports can be only the cells using the shared frequency bands, and can also be all the cells using each frequency band of the shared spectrum pool in the first network A.

Figure 4:
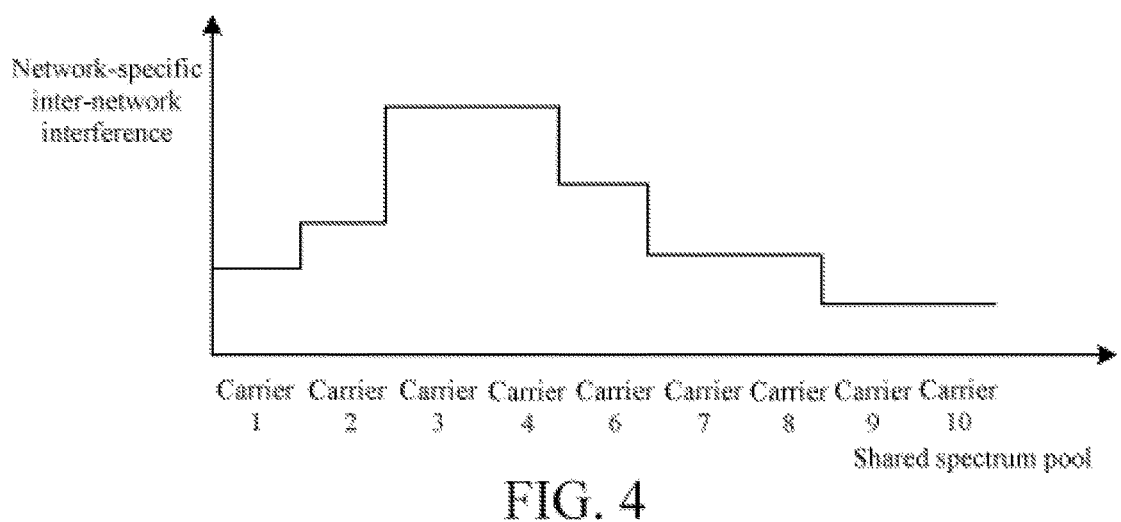
FIG. 4 is a schematic diagram of network-specific inter-network interference values of the first embodiment in FIG. 1.

For each carrier in the shared spectrum pool, according to the cell-specific inter-network interferences reported by all the cells allocated with the carrier, the management node of the operator calculates inter-network interference averages, so that an inter-network interference average correspondingly to each carrier of the network, which serves as the network-specific inter-network interference of the first network A, is obtained, as shown in FIG. 4. FIG. 4 shows the average of the cell-specific inter-network interference on each carrier, for example, the inter-network interference average of the carrier 1 is less than the inter-network interference average of the carrier 2, and the inter-network interference averages of the carrier 3 and the carrier 4 are equal.

As an alternative mode, for each carrier in the shared spectrum pool, the management node of the operator can find out a maximum value among the cell-specific inter-network interferences reported by all the cells allocated with the carrier, to serve as maximum inter-network interference received by the first network A on each carrier. Information of the maximum inter-network interference on each carrier is gathered to generate network-specific inter-network interference. In other words, FIG. 4 shows the gathered maximum value among the cell-specific inter-network interference on each carrier. For example, the maximum value of the inter-network interferences of the carrier 1 is less than the maximum value of the inter-network interferences of the carrier 2, and the maximum value of the inter-network interferences of the carrier 3 and the carrier 4 are equal.

Step 3: The first network judges whether the inter-network interference exceeds a threshold.

According to the network-specific inter-network interference gathered in Step 2, the management node $O\&M_A$ entity of the operator of the first network A in FIG. 3 judges whether there are cells with inter-network interference on specific carriers exceeding the preset threshold. If the inter-network interference of each cell does not reach the threshold, it indicates that no cells suffer from strong interference (inter-network interference value exceeding the threshold). If the judgment result is NO, and then turn to the step of "evaluating inter-network interference" to conduct inter-network interference evaluation again. If the inter-network interference of a certain cell on a specific carrier exceeds the threshold, then the judgment result is YES, and the next step is executed.

Step 4: The first network judges whether to execute internal coordination.

According to the network-specific inter-network interference value and the allocable resource of the first network, the management node $O\&M_A$ of the first network judges whether to execute internal coordination. If the first network has an allocable resource to meet the requirement of the network-specific inter-network interference, then it is judged that internal coordination can be executed without initiating inter-network coordination, and Step 5 is executed; if the first network does not have enough allocable resources to meet the requirement of the network-specific inter-network interference, then it is judged that inter-network coordination needs to be initiated, network-specific inter-network interference indication is sent to the second network, and Step 6 is executed.

The first network sends out the network-specific inter-network interference indication, which is used for communicating the inter-network interference value on each carrier, received by the first network, in the shared frequency band or the shared spectrum pool to the second network.

The communication of network-specific inter-network interference can be conducted periodically, and the communication period is determined by negotiation between the operators, or can be event-triggered. It can be understood that the choice of event triggering or periodical triggering or the combination of both is determined according to the actual service condition of the networks.

In the case of event triggering, the network-specific inter-network interference indication communication criterion is that, after the operation management node receives the cell-specific inter-network interference report from the base station, if some cells served by the station suffer from strong inter-network interference, the inter-network interference is first tried to be reduced by intra-network interference coordination in the operator (for example, scheduling these cells to the exclusive frequency band or some low-interference shared frequency bands). If coordination in the operator cannot reduce the inter-network interference to an appropriate interference level or the cost is too high (for example, a resource scheduling policy with affection on most of the cells in the network), then the operators seek inter-network interference coordination between the operators by communicating network-specific inter-network interference indication.

The determination of triggering events depends on an intra-operator coordination measure which is adopted by the operator to cope with strong inter-network interference. In the embodiment, the first network A conducts intra-network interference coordination in the operator to avoid strong inter-network interference by allocating the carriers in the exclusively occupied frequency band of the first network A to certain strong interference-affected cells. However, if the first network A does not have enough exclusively occupied carriers to be allocated to these cells, then the first network A send the network-specific inter-network interference indication generated in the previous measurement period by the first network A, to the second network B, in order to seek interference coordination between the operators.

The signaling format of network-specific inter-network interference indication which includes signaling name, range, signaling type and specific description is as follows. Signaling name means the name of a signaling, and is network-specific inter-network interference indication (a network-specific inter-network interference indication of the uplinks and a network-specific inter-network interference indication of the downlinks should be differentiated). Range means how many carriers, in the shared spectrum pool, corresponding to the signaling there are. Signaling content means cell-specific inter-network interference value. Specific description means carrier numbers of the corresponding carriers. By such a signaling, the network-specific inter-network interference indication can describe how much the network-specific inter-network interference value of a specific carrier is.

Network-specific inter-network interference indicates the inter-network interference value received by the first network on each carrier in the shared frequency band or the shared spectrum pool. Under the condition that the cells using the shared frequency band submit inter-network interferences received by themselves, in the step of "the first network evaluates inter-network interference", the network-specific inter-network interference indication includes the inter-network interference value received by the first network on each carrier in the shared frequency band. Under the condition that the cells using every frequency band of the shared spectrum pool in the first network submit inter-network interferences received by themselves, in the step of "the first network evaluates inter-network interference", the network-specific inter-network interference indication includes the inter-network interference value received by the first network on each carrier in the shared spectrum pool.

The following table only shows the case that network-specific inter-network interference indication includes the inter-network interference value on each carrier in the shared spectrum pool. Under the case that network-specific inter-network interference indication includes the shared frequency band, corresponding adjustment could be conducted. For example, the N of "Range" of the following table is adjusted as a maximum carrier number in the shared frequency band.

| Signaling Name | Range | Signaling Content | Specific Description |
| --- | --- | --- | --- |
| network-specific inter-network interference indication (downlink/uplink) | 1-N (N is a maximum carrier number in the shared spectrum pool.) | specific interference value (average or maximum value of cell-specific inter-network interferences reported by all cells) | corresponding carrier number (according to the positions of carriers in a shared spectrum pool, the carriers can be marked with numbers, such as CC0, CC1, etc.) |

Network-specific inter-network interference indication in the two above-mentioned modes is not quantified, and interference level judgment can be made according to a preset threshold after communication.

It should be noted that Step 3 (the first network judges whether the inter-network interference exceeds a threshold) can be integrated into Step 4. For example, under the case that Step 3 does not exist, after the inter-network interference evaluation is fulfilled in Step 2, in Step 4, the first network judges that the network-specific inter-network interference exceeds the threshold according to the network-specific inter-network interference obtained in Step 2, and then executes Step 4. If it is judged that the network-specific inter-network interference does not exceed the threshold, then Step 2 can be directly executed again. If it is judged that the inter-network interference exceeds the threshold and internal coordination can be executed, then the first network executes internal coordination; and if it is judged that the inter-network interference exceeds the threshold but internal coordination cannot be executed, then the first network initiates inter-network coordination to the second network.

The principle of judging whether the first network executes internal coordination is as follows:

1. Are there enough exclusive frequency bands which can be allocated to the interference-affected cells? If there are enough exclusive frequency bands, then when the first network executes internal coordination, the exclusive frequency bands are allocated to the interference-affected cells, and then turn to the step of "the first network evaluates inter-network interference". If there aren't enough exclusive frequency bands, then turn to the step of "the first network and the second network negotiate about an inter-network shared frequency band"; or 2. Can corresponding users of the interference-affected cells be handover to the neighboring cells? Whether the first network can handover the corresponding users of the interference-affected cells to the neighboring cells is judged, if handover can be done, then the corresponding users are handovered to the neighboring cells, and if handovering cannot be done, then turn to the step of "the first network and the second network negotiate about inter-network frequency band sharing"; or 3. Can other shared carriers be allocated to the interference-affected cells? Whether the first network can schedule the interference-affected cells to new carriers different from the currently used carriers is judged, and both the currently used carriers and the new carriers are in the shared frequency band; if scheduling can be done, then the interference-affected cells are scheduled to the new carriers, and then turn to the step of "the first network evaluates inter-network interference". If scheduling cannot be done, then turn to the step of "the first network and the second network negotiate about inter-network frequency band sharing".

These three modes can be used in combination, or more than one of the three modes can be chosen, or only one of the three modes can be chosen as well. In the embodiment, only the exclusive frequency band mode is taken as an example for explanation.

Step 5: The first network executes internal coordination.

In Step 4, according to the network-specific inter-network interference and the allocable resource of the first network, the management node of the first network judges that internal coordination can be executed. At this point, the management node $O\&M_A$ of the first network can adopt a variety of internal coordination modes. One is exclusive carrier allocation. The management node $O\&M_A$ of the first network judges whether the first network has enough exclusive frequency bands which can be given to the strong interference-affected cells ($eNB_{A1}$ in the embodiment) of the first network. If the first network has allocable exclusive frequency bands, then the interference-affected cells are scheduled to the exclusively occupied frequency bands (exclusive frequency band), so that the cells are prevented from suffering from strong interference. It can be understood that other modes can also be chosen, such as handovering the users of the interference-affected cells to the neighboring cells, or trying to allocate the other carriers in the shared frequency band.

Step 6: The first network communicates the network-specific inter-network interference to the second network.

The first network A initiates negotiation with the second network B, and sends network-specific inter-network interference indication to the second network B, so that the second network B obtains the specific interference values and corresponding carriers of the interference-affected cells of the first network A.

Step 7: The second network judges whether the interference can be reduced.

The second network receives the network-specific inter-network interference indication coming from the first network, and judges whether the second network can reduce interference, according to the magnitude of the network-specific inter-network interference, the allocable resource of the second network, and adjustment modes of the second network.

Figure 5:
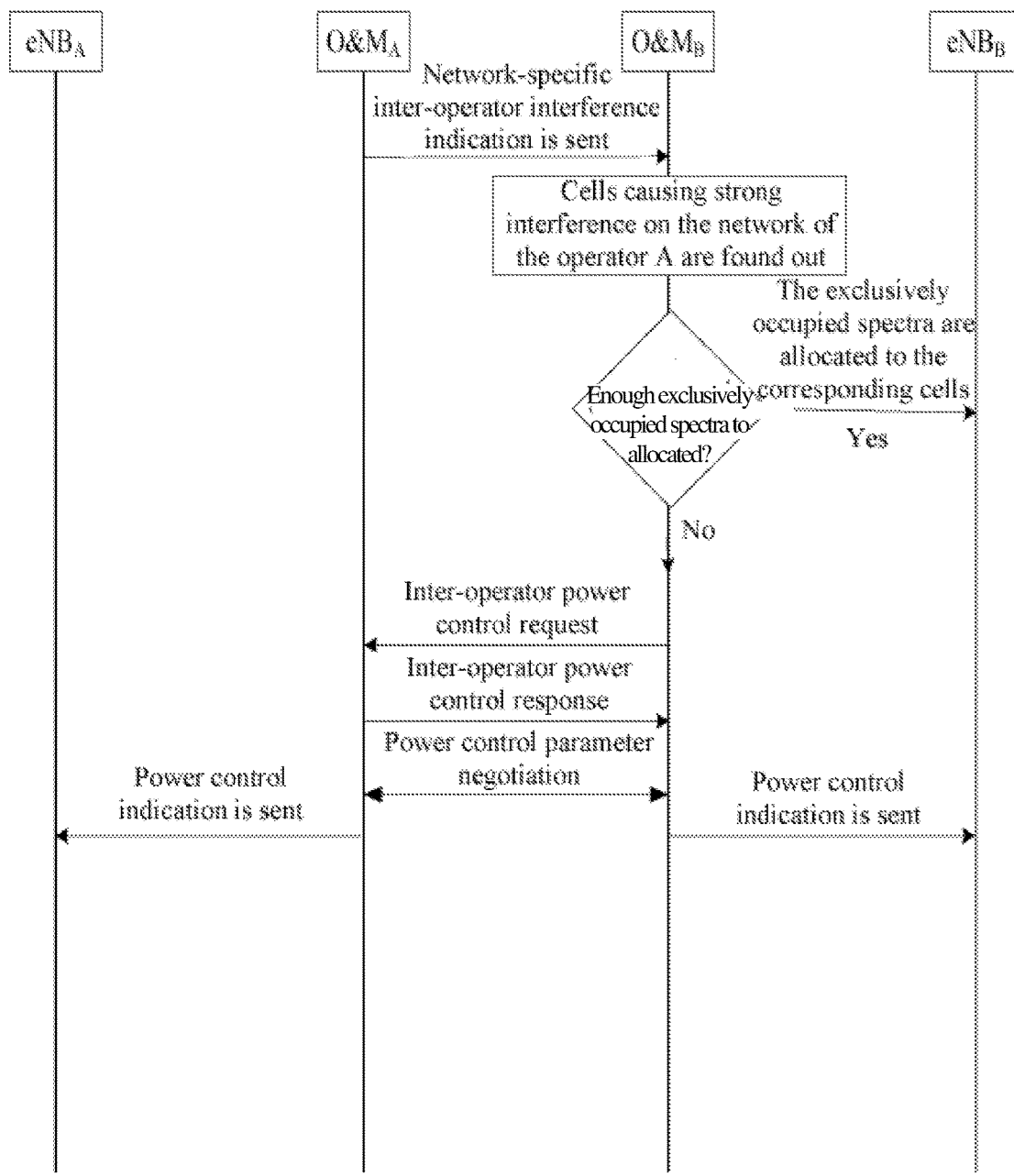
FIG. 5 is a schematic time sequence diagram after inter-network coordination initiation of the first embodiment in FIG. 1.

Referring to FIG. 5, according to the corresponding carriers in the network-specific inter-network interference indication coming from the first network A, the management node $O\&M_B$ of the second network B needs to find out the cells of the second network B assigned to the corresponding carriers, by searching for the carrier allocation record (i.e., scheduling record) of the second network B in a certain period past, for the strong interference-affected carriers in the first network A. And, the $O\&M_B$ finds out interference-causing cells causing the strong interference on the first network A in the second network B according to the cell-specific inter-network interference report from these cells. In other words, the second network B finds out the interference-causing cells according to the received inter-network interference indication from the first network A and the scheduling record of the second network B.

In combination with the allocable resource and the adjustment mode, it is judged that the second network B can reduce interference, then Step 8 is executed; if the second network B cannot reduce interference, then it is judged that the second network B needs to negotiate with the first network for solution, and Step 1 is executed again so as to negotiate a resource sharing solution between the first network and the second network again.

Whether the second network B has the ability to reduce interference is judged, and the judgment criteria are as follows: (1) whether there are enough exclusively occupied frequency bands which can be allocated to the interference-causing cells causing the strong interference on the first network A; (2) whether the range of the cells causing the strong interference can be reduced (by decreasing transmission power); or (3) whether the interference-causing cells can be scheduled to other shared carriers. The other shared carriers mean carriers which belong to the same shared frequency band as the carriers currently used by the interference-causing cells but are different from the currently used carriers. Of course, according to the specific circumstance of network communication, other means for reducing interference can also be chosen.

It can be understood that only one or two or all of the three internal coordination modes of allocating an exclusive frequency band, decreasing transmission power and scheduling carriers can be chosen.

For example, allocating an exclusive frequency band and decreasing transmission power are chosen as internal coordination modes. When the second network judges whether to execute internal coordination, if there aren't enough exclusive frequency bands, then the second network judges whether there is another adjustment (decreasing transmission power) mode; if the transmission power cannot be decreased, then turn to the step of "the first network and the second network negotiate about inter-network frequency band sharing"; if the transmission power can be decreased, then when the second network executes internal coordination, the transmission power of the interference-causing cells is decreased, and then turn to the step of "the first network evaluates inter-network interference". When the second network judges whether to execute internal coordination, if there are enough exclusive frequency bands, then the second network allocates the exclusive frequency bands to the interference-causing cells, and then turn to the step of "the first network evaluates inter-network interference".

FIG. 3 provides the case regarding allocating an exclusive frequency band as the internal coordination mode. When a resource sharing solution is negotiated again to adjust the inter-network spectrum occupation mode, the management node $O\&M_B$ of the second network B sends out an inter-network spectrum reallocation request to the management node $O\&M_A$ of the first network, and if the first network A agrees with the request, then the first network A returns an inter-network spectrum reallocation response signaling to the $O\&M_B$. Then the update of the inter-network spectrum occupation mode is triggered, and the operator A and the operator B can negotiate about a new spectrum allocation mode to prevent interference. For example, it can be considered to allocate more exclusively occupied spectrum resources to each operator and reduce the proportion of shared frequency band resources in the shared spectrum pool.

Step 8: The second network conducts internal coordination.

In combination with FIG. 5, the management node $O\&M_B$ of the second network first judges whether there are enough exclusive frequency bands which can be allocated to each cell causing interference on the first network A (for example, $eNB_B$ in the embodiment) of the second network. If the second network has an allocable exclusive frequency band, then the frequency band is allocated to the cell $eNB_B$ in order to prevent the cell from causing strong interference on the first network.

If there isn't an allocable exclusive frequency band, then other adjustment modes can be adopted. FIG. 5 explains the mode of decreasing the transmission power of the interference-causing base station $eNB_B$ as an example. The management node $O\&M_B$ of the second network B sends an inter-network power control request to the management node of the first network A to carry out power negotiation with the first network A. After the management node $O\&M_A$ of the first network A sends out a response, the second network B initiates power control parameter negotiation. After power control parameters are determined, the management node of the first network A sends a power control instruction to the interference-affected base station $eNB_A$, the management node of the second network B sends a power control instruction to the interference-causing base station $eNB_B$, and as a result, the transmission power of the interference-causing cell base station $eNB_B$ is decreased.

In other words, as shown in FIG. 5, when power adjustment is conducted, the $O\&M_B$ of the operator B sends an inter-network power control request to the $O\&M_A$ of the operator A, and if the operator A agrees with the request, then the operator A returns an inter-network power control response signaling to the $O\&M_B$. Then the operator A and the operator B negotiate about specific parameters (such as maximum transmission power limit) related to power control. Afterward, the O&M entities of the two operators respectively send a power control instruction signaling to the cells causing or affected by the strong inter-network interference, and cell power is adjusted independently in order to achieve the effect of inhibiting inter-network interference.

The invention effectively solves interference coordination between networks with the same priority; when strong inter-network interference exceeds a threshold, intra-network coordination is first conducted, and inter-network coordination is then conducted; while the networks with the same priority can fairly and reasonably use a shared frequency band, the efficiency of interference coordination is increased, and network performance is effectively improved.

<Second Embodiment>

In order to briefly introduce the second embodiment of the invention, only the differences of the second embodiment from the first embodiment are described.

Figure 6:
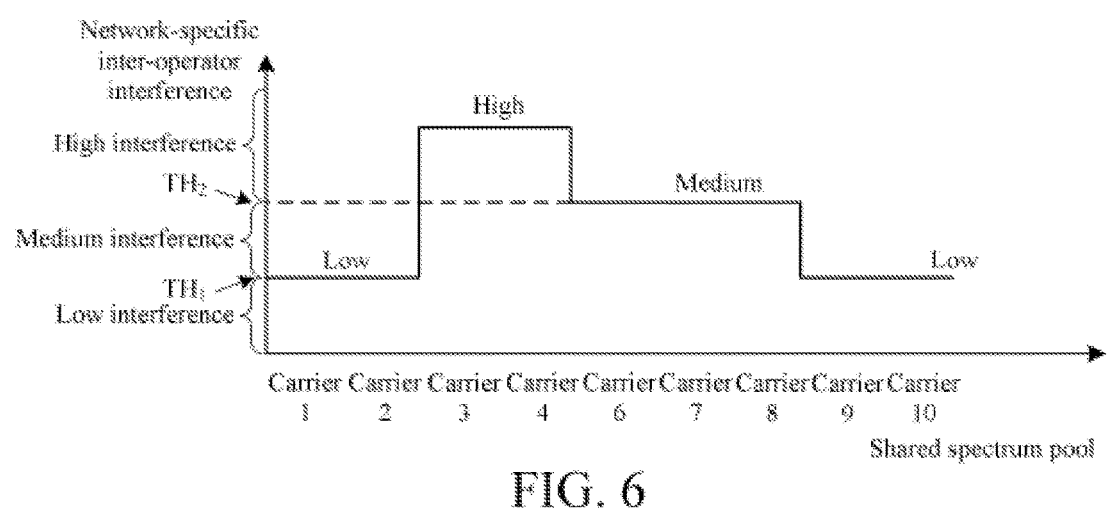
FIG. 6 is a schematic diagram of network-specific inter-network interference values of a second embodiment of the invention.

FIG. 6 shows network-specific inter-network interference of each carrier in a shared spectrum pool of the second embodiment. Different from FIG. 4 in the first embodiment, the network-specific inter-network interference value in the second embodiment, which is is quantified and divided into high interference, medium interference and low interference, while the network-specific inter-network interference value in the first embodiment is non-quantified. The signaling format of the network-specific inter-network interference value in the second embodiment is as follows. Different from the "Signaling Content" of the first embodiment, the "Signaling Content" of the second embodiment is interference level description (quantified values).

| Signaling Name | Range | Signaling Content | Specific Description |
|---|---|---|---|
| network-specific inter-network interference | 1-N (N is a maximum carrier number in the | interference level description (high interference, | corresponding carrier number (according to the positions of carriers |

| Signaling Name | Range | Signaling Content | Specific Description |
| --- | --- | --- | --- |
| indication (downlink/ uplink) | shared spectrum pool.) | medium interference and low interference) | in a shared spectrum pool, the carriers can be marked with numbers, such as CC0, CC1, etc.) |

Specifically, the second embodiment has three types of modes:

<Mode 1>

The second embodiment is like the first embodiment, and as shown in FIG. 4, for each carrier in the shared spectrum pool, according to the cell-specific inter-network interferences reported by all the cells allocated with the carrier, the management node of the operator calculates inter-network interference averages, so that an inter-network interference average correspondingly to each carrier received by the network is obtained.

As shown in FIG. 6, on the basis of the cell-specific inter-network interference average on each carrier received by the network, N (a positive integer) interference thresholds are chosen to quantify the cell-specific inter-network interference averages, consequently, there are N+1 levels corresponding to the cell-specific inter-network interference average received by the network on each carrier, and quantified results are adopted at network-specific inter-network interference indication.

<Mode 2>

Like the alternative mode in the first embodiment, for each carrier in the shared spectrum pool, the management node of the operator can find out a maximum among the cell-specific inter-network interferences reported by all the cells allocated with the carrier, according to the cell-specific inter-network interferences (inter-network interference), to serve as maximum inter-network interference received by the first network A on each carrier.

Referring to FIG. 6, on the basis of the maximum inter-network interference on each carrier, N network interference thresholds are chosen to quantify the maximum interference values, consequently, there are N+1 levels corresponding to the inter-network maximum interference received by the network on each carrier, and quantified results are adopted as network-specific inter-network interference indication.

In the mode 1 and the mode 2, the network-specific inter-network interference indication is obtained by quantification with the N thresholds. Taking N=2 as an example, two thresholds TH1 and TH2 are set, and TH1 is less than TH2. Then the inter-network interferences on all the carriers can be divided into three levels: high inter-network interference, medium inter-network interference and low inter-network interference. The rule of quantifying network-specific inter-network interference on each carrier is as follows: if average interference/maximum interference value is greater than or equal to TH2, then high inter-network interference is determined; if average interference/ maximum interference value is greater than or equal to TH1 and less than TH2, then medium inter-network interference is determined; otherwise, low inter-network interference is determined.

<Mode 3>

M inter-network interference thresholds are chosen, to quantify the cell-specific inter-network interference reports submitted by all the base stations into M+1 levels. Correspondingly to each carrier, the quantity of the cells with cell-specific inter-network interferences at each level is counted. Then referring to a preset rule, the levels of inter-network interferences received by the network on the different carriers are judged according to the quantity of the cells with different cell-specific inter-network interference levels, so that network-specific inter-network interference indication is formed.

M=1 is chosen in the embodiment, and the O&M entity of the operator divides different cell-specific inter-network interference on each carrier into strong interference and weak interference according to a preset threshold $TH_{ST}$: If cell-specific inter-network interference is greater than or equal to the $TH_{ST}$, then the cell-specific inter-network interference is strong interference, otherwise is regarded as weak interference. Then the O&M entity of the operator counts the number or proportion $N_H$ of cells suffering from strong inter-network interference on each carrier, and according to two thresholds $TH_{N1}$ and $TH_{N2}$ (wherein the $TH_{N1}$ is less than the $TH_{N2}$), the network-specific inter-network interferences on all the carriers are then divided into three levels.

If the $N_H$ is greater than or equal to the $TH_{N2}$, then the network-specific inter-network interference on the corresponding carrier is determined as high interference; if the $N_H$ is greater than or equal to $TH_{N1}$ and less than $TH_{N2}$, then the network-specific inter-network interference on the corresponding carrier is determined as medium interference; otherwise, the network-specific inter-network interference on the corresponding carrier is determined as low interference.

<Third Embodiment>

Figure 7:
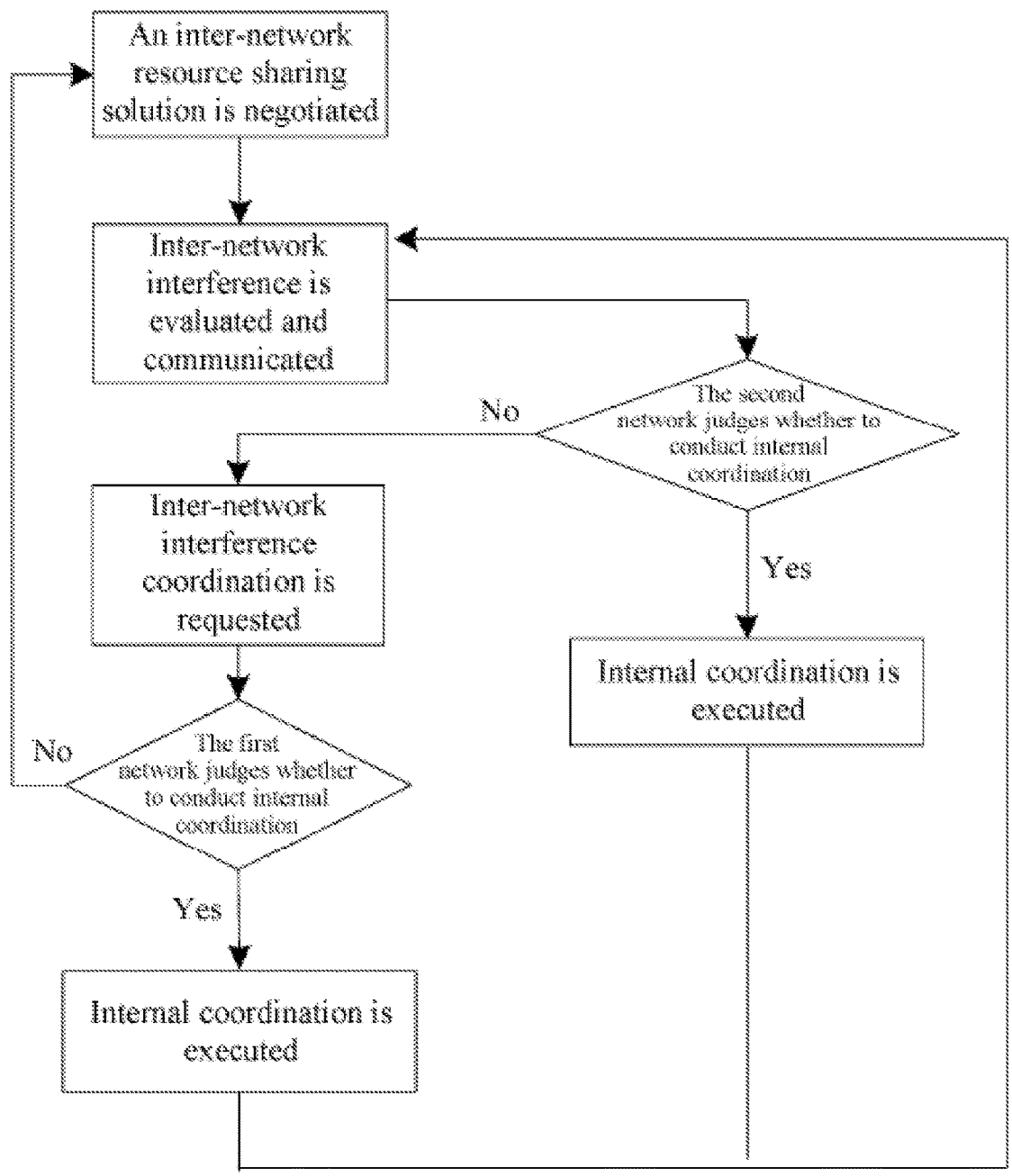
FIG. 7 is an overall flow block diagram of a third embodiment of the invention.
Figure 8:
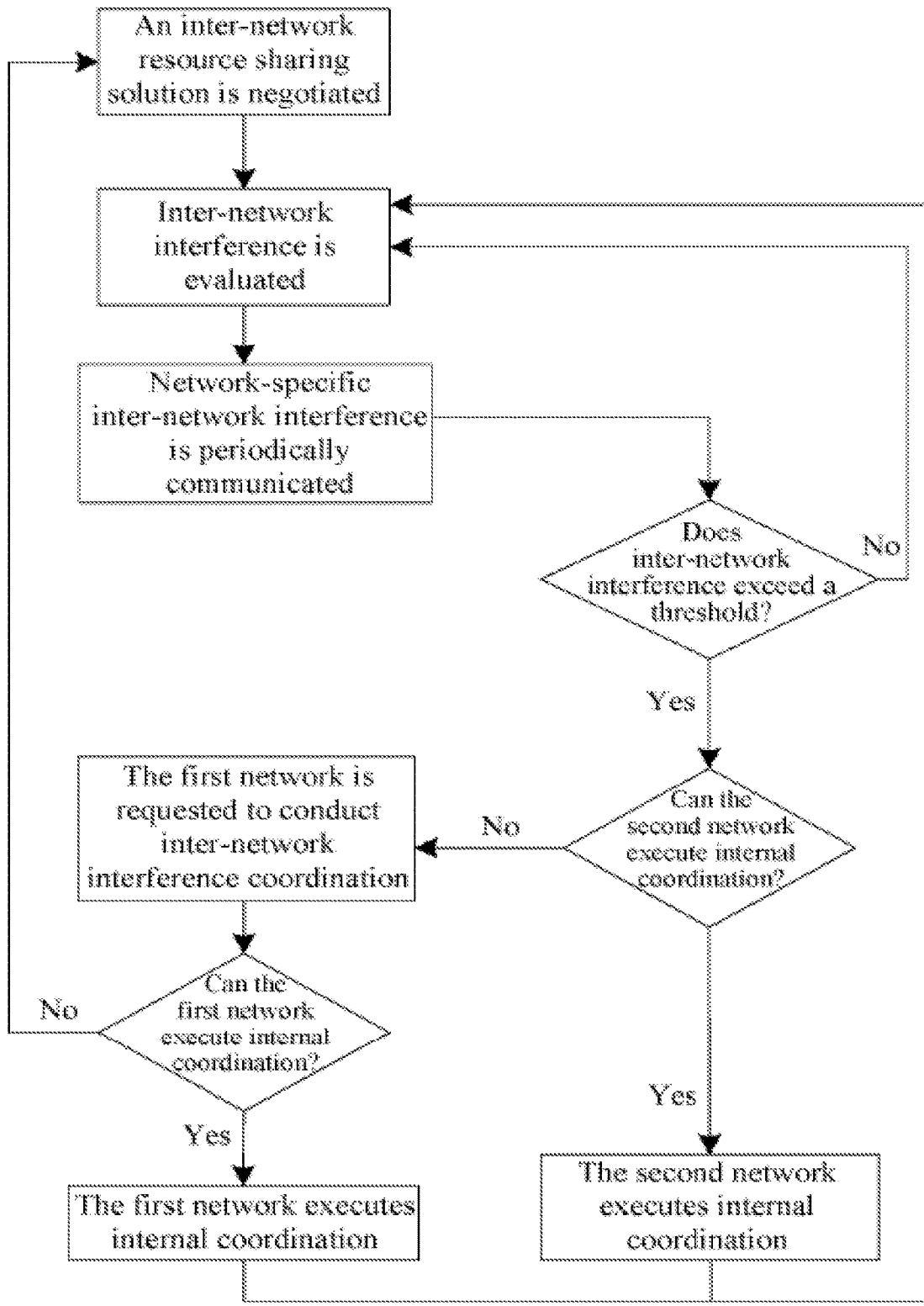
FIG. 8 is a specific flow block diagram of the third embodiment in FIG. 7.

The flows in FIG. 1, FIG. 2 and FIG. 3 in the invention are event-triggered examples, and the flows in FIG. 7 and FIG. 8 are periodically triggered examples. Referring to FIG. 7 and FIG. 8, a case of periodically communicating network-specific inter-network interference information which is provided by the third embodiment is introduced below.

Under the condition that network-specific inter-network interference indication communication between operators is the periodical triggering mode, in every T time, network-specific inter-network interference indication which is generated in the previous period of measurement is communicated between the two networks.

The first network periodically sends network-specific inter-network interference indication to all the networks spectrum-sharing with the first network, including the second network. Each network spectrum-sharing with the first network judges alone which cells deployed in the network cause interference on the first network. The steps are as follows:

An inter-network resource sharing solution is negotiated;
the first network evaluates and communicates inter-network interference;
the second network judges whether to execute internal coordination, if internal coordination can be executed, then the second network executes internal coordination, and then turn to the step of "the first network evaluates and communicates inter-network interference"; if internal coordination cannot be executed, then the first network is requested to conduct inter-network interference coordination;
the first network judges whether to execute internal coordination, if internal coordination can be executed, then internal coordination is executed by the first network, and then turn to the step of "the first network evaluates and communicates inter-network interference"; and if internal coordination cannot be executed, then turn to the step of "an inter-network resource sharing solution is negotiated".

Specifically, as shown in FIG. 7 and FIG. 8, after evaluating inter-network interference, the first network periodically communicates network-specific inter-network interference to all the neighboring networks, including the second network. According to the corresponding carriers in "Specific Description" in network-specific inter-network interference indication, each neighboring network (for example, the second network in FIG. 7) judges alone which cells in the neighboring network cause the interference on the first network (in other words, which cells in the neighboring network causes the inter-network interference on the first network is judged).

According to a specific interference value of "Signaling Content" in network-specific inter-network interference indication, each neighboring network judges whether the inter-network interference exceeds a threshold. If the inter-network interference does not exceed the threshold, then turn to the step of "the first network evaluates inter-network interference" to re-evaluate the inter-network interference; if the inter-network interference exceeds the threshold, then according to intra-network resources (the internal resources of the second network in FIG. 7), the neighboring network judges whether the inter-network interference could be reduce by executing internal coordination.

If internal coordination can be executed, then the second network executes internal coordination; if the internal resources are not enough, then requests the first network (the network sending out network-specific inter-network interference) to conduct inter-network interference coordination. The first network judges whether the first network conducts internal coordination for solution or negotiates with the second network about an inter-network resource sharing solution again.

The advantage of the embodiment is as follows: The interference-affected network (the first network) periodically sends out inter-network interference, the interference-causing network (the second network) needs to conduct internal coordination first, and under the condition that the requirement cannot be met, the interference-affected network then conducts internal coordination. Such a mechanism makes the interference-causing network to bear more resource cost for inter-network coordination than the interference-affected network does to some degree, which helps to promote each network to fairly and reasonably use shared resources.

<Fourth Embodiment>

Figure 9:
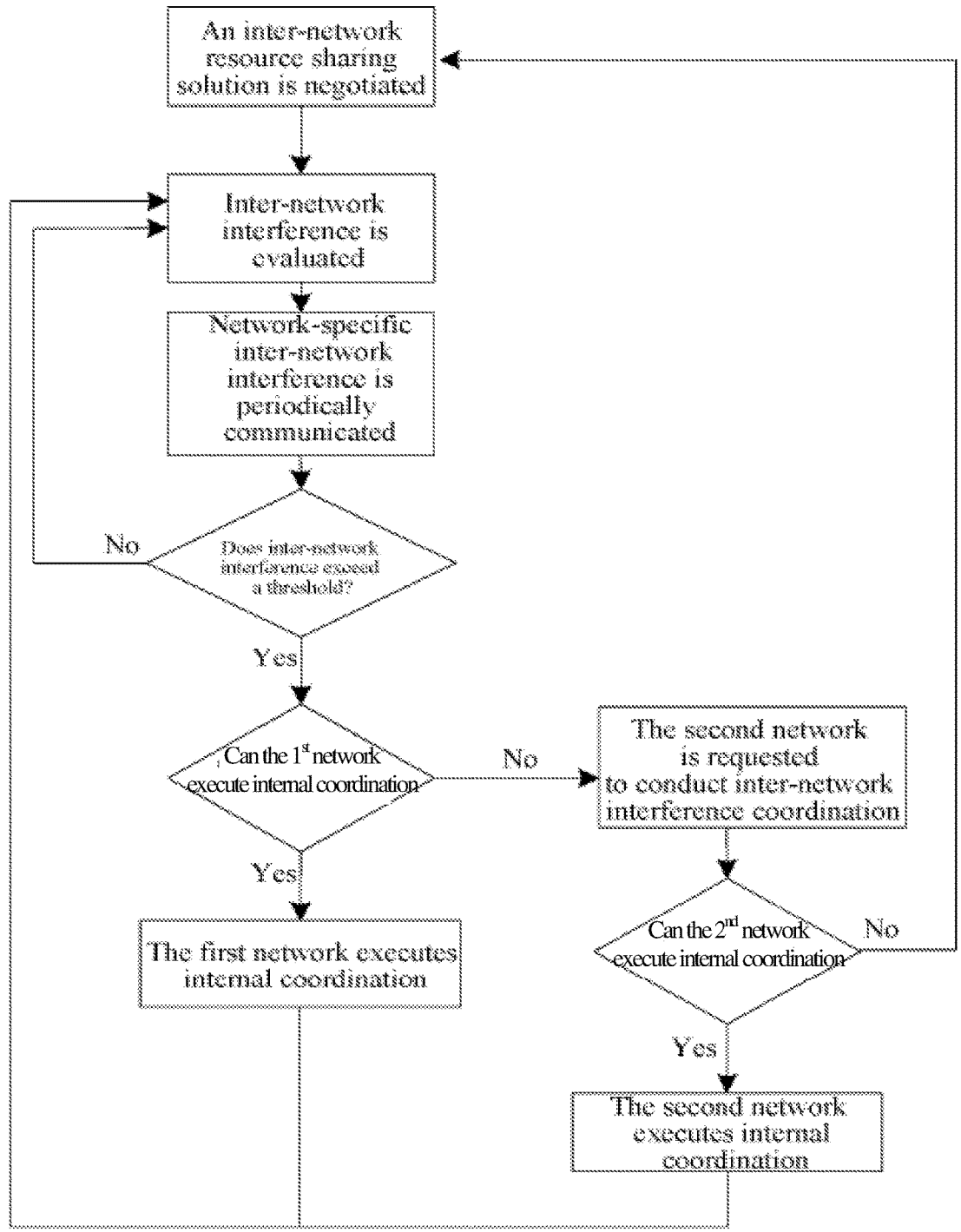
FIG. 9 is a flow block diagram of a fourth embodiment of the invention.

Referring to FIG. 9, the fourth embodiment is a case of event-triggered inter-network interference coordination and periodical network-specific inter-network interference communication at the same time. The difference between the fourth embodiment and the first embodiment is that after Step 2 (the first network evaluates inter-network interference) in the first embodiment, a step of periodical network-specific inter-network interference communication is added.

The method in the fourth embodiment includes the following steps:
an inter-network resource sharing solution is negotiated;
the first network evaluates and communicates inter-network interference;
the first network judges whether to execute internal coordination, if internal coordination can be executed, then the first network executes internal coordination, and then turn to the step of "the first network evaluates and communicates inter-network interference"; if internal coordination cannot be executed, then the second network is requested to conduct inter-network interference coordination;
the second network judges whether to execute internal coordination, if internal coordination can be executed, then second network executes internal coordination, and then turn to the step of "the first network evaluates and communicates inter-network interference"; and if internal coordination cannot be executed, then turn to the step of "an inter-network resource sharing solution is negotiated".

Thus it can be seen that the difference between the fourth embodiment and the third embodiment is as follows: the first network evaluates inter-network interference, and periodically communicates network-specific inter-network interference to the second network, moreover, the first network judges whether the inter-network interference exceeds a threshold, and under the condition that the inter-network interference exceeds the threshold, the first network first judges whether internal coordination can be conducted, and initiates inter-network coordination only under the condition that the internal coordination cannot be conducted.

The mode of the embodiment is that the first network judges whether to initiate inter-network coordination, and moreover, the second network periodically obtains an inter-network interference value from the first network. Compared with the first embodiment, the present embodiment can prevent frequent signaling interaction between the networks by setting a communication period. Compared with the third embodiment, the advantage of the present embodiment is that each network preferentially adopts the internal coordination measure to avoid strong inter-network interference, preventing the requirement on frequent adjustment of networks in different operators.

Further, since the first network has already communicated network-specific inter-network interference to the second network, the first network can comprehensively learn about inter-network interferences coming from other networks to the first network, and inter-network interference generated by the first network itself on the other networks. Likewise, the second network can also comprehensively learn about inter-network interferences coming from other networks to the second network, and inter-network interference generated by the second network itself on the other networks. Consequently, the first network and the second network could precisely figure out the cells causing strong inter-network interference and the cells suffering the strong inter-network interference, and then adopt an effective coordination solution.

The network spectrum sharing method provided by the invention is explained in detail above. For those skilled in the art, any obvious modifications which are made on the invention under the premise of not departing from the substantial spirit of the invention will violate the patent right of the invention, and will bear corresponding legal liability.

What is claimed is:

1. A network interference coordination method for a first network and a second network which share a shared spectrum pool with the same priority, comprising the following steps:
a step that the first network and the second network negotiate about an inter-network shared frequency band, wherein the shared frequency band is in the shared spectrum pool;
a step that the first network evaluates inter-network interference;
a step that one network of the first network and the second network judges whether to execute internal coordination, if internal coordination can be executed, then the one network executes internal coordination, if internal coordination cannot be executed, then the one network request an another network to conduct inter-network interference coordination;
a step that the another network judges whether to execute internal coordination, if internal coordination can be executed, then the another network executes internal coordination; and if internal coordination cannot be executed, then turn to the step of "the first network and the second network negotiate about an inter-network shared frequency band".

2. The network interference coordination method according to claim 1, wherein,
the one network is the second network and the another network is the first network, the first network evaluates and communicates inter-network interference to the second network, and then the second network judges whether to execute internal coordination based on the inter-network interference.

3. The network interference coordination method according to claim 1, wherein,
after the step of first network evaluates inter-network interference, the one network judges whether the inter-network interference exceeds a threshold, and if the inter-network interference exceeds the threshold, then the one network judges whether to execute internal coordination; and if the inter-network interference does not exceed the threshold, then the first network evaluates the inter-network interference again.

4. The network interference coordination method according to claim 1, wherein,
when the one network request the another network to conduct inter-network interference coordination,
the one network sends network-specific inter-network interference indication to the another network to request the another network to conduct inter-network interference coordination,
the network-specific inter-network interference indication includes specific interference values and corresponding carrier numbers, or includes interference levels and corresponding carrier numbers.

5. The network interference coordination method according to claim 4, wherein,
when the second network is requested to conduct inter-network interference coordination, the second network determines interference-causing cells in the second network which cause interference to the first network, according to the corresponding carrier numbers in the network-specific inter-network interference indication received by the second network.

6. The network interference coordination method according to claim 1, wherein,
the another network judges whether the inter-network interference exceeds a threshold, and if the inter-network interference exceeds a threshold, then the second network judges whether to execute internal coordination.

7. The network interference coordination method according to claim 1, wherein,
the first network and the second network negotiate about an inter-network shared frequency band, and also negotiate about exclusive frequency bands for the first network and exclusive frequency bands for the second network,
when the second network judges whether to execute internal coordination, the second network judges whether there are enough exclusive frequency bands which can be allocated to the interference-causing cells.

8. The network interference coordination method according to claim 1, wherein,
when the second network judges whether to execute internal coordination, the second network judges whether the second network can decrease transmission power of the interference-causing cells or reschedule the interference-causing cells to new carriers.

9. The network interference coordination method according to claim 6, wherein,
when the second network returns to negotiate about an inter-network shared frequency band with the first network, the second network sends an inter-network spectrum reallocation request to the first network, and if the first network agrees, then an inter-network spectrum reallocation response signaling is sent to the second network to trigger the update of a network spectrum occupation mode.

10. The network interference coordination method according to claim 1, wherein,
the first network comprises interference-affected cells suffering from interference of the second network;
when the first network judges whether to execute internal coordination, the first network judges whether the first network has enough exclusive frequency bands to be allocated to the interference-affected cells.

11. The network interference coordination method according to claim 6, wherein,
when the first network evaluates and communicates inter-network interference, the first network periodically communicates network-specific inter-network interference indication to the second network, and according to corresponding carriers in the network-specific inter-network interference indication, in combination with carrier allocation information of each cell of the second network, the second network figure out interference-causing cells of the second network causing interference on the first network.

12. The network interference coordination method according to claim 1, wherein,
the step of "the first network evaluates inter-network interference" includes the following steps:
Step 2A: a terminal of the first network estimates and sends inter-network interference received by the terminal to a base station of the first network;
Step 2B: according to the inter-network interference reported by the terminal, the base station estimates cell-specific inter-network interference in the first network;
Step 2C: within a given statistical period, the base station calculates inter-network interference power on each resource block, and then calculates a cell-specific inter-network interference average on the basis of the inter-network interference power on each resource block in a carrier allocated by the base station, to generate a cell-specific inter-network interference report.

13. The network interference coordination method according to claim 12, wherein,
in Step 2A, the cells using the shared frequency band or all the cells using the shared spectrum pool in the first network submit inter-network interferences received by the cells.

14. The network interference coordination method according to claim 12, wherein, according to the cell-specific inter-network interferences reported by all the cells assigned to each carrier in the shared frequency band, an average or maximum value of the inter-network interferences received by the network on each carrier is obtained, the average or maximum value of the inter-network interferences are added up, and thereby network-specific inter-network interference is obtained.

15. The network interference coordination method according to claim 12, wherein, the network-specific inter-network interference is obtained by the following method:

for each carrier in the shared frequency band, an average or maximum value of inter-network interferences received by the network on the carrier is obtained, according to cell-specific inter-network interferences reported by all the cells assigned to the carrier, and N network interference thresholds are chosen to quantify the average or maximum values of the inter-network interferences, so that N+1 levels which respectively correspond to the inter-network interference average received by the network on each carrier are obtained to serve as network-specific inter-network interference indication, N is the number of network interference thresholds.

16. The network interference coordination method according to claim 12, wherein, the network-specific inter-network interference is obtained by the following method:

M inter-network interference thresholds are chosen to quantify the cell-specific inter-network interference reported by each base station into M+1 levels, which respectively correspond to each carrier, the quantity of the cells with cell-specific inter-network interferences at each level is counted, and the network-specific inter-network interference indication is generated on the basis of the cell quantity, M is the number of inter-network interference thresholds.

17. The network interference coordination method according to claim 12, wherein, in the step of "the first network evaluates inter-network interference", the cells using the shared frequency band or all the cells using the shared spectrum pool in the first network report the inter-network interferences they received;

in the case that the cells using the shared frequency band report the inter-network interferences, the network-specific inter-network interference indication includes inter-network interference values received by the first network on each carrier in the shared frequency band or in the shared spectrum pool;

in the case that all the cells using the shared spectrum pool in the first network report the inter-network interferences they received, the network-specific inter-network interference indication includes inter-network interference values received by the first network on each carrier in the shared spectrum pool.

18. The network interference coordination method according to claim 1, wherein, the first network comprises interference-affected cells suffering from interference of the second network;

when the first network judges whether to execute internal coordination, the first network judges whether the first network can handover the corresponding users of the interference-affected cells to neighboring cells.

19. The network interference coordination method according to claim 1, wherein, when the first network evaluates inter-network interference, the first network calculates cell-specific inter-network interference on the basis of inter-network interference power on each resource block in a carrier, according to inter-network interference received by the terminal.

20. The network interference coordination method according to claim 19, wherein, the cell-specific inter-network interference report includes the inter-network interference averages of specific carriers and the corresponding carrier numbers.

* * * * *